(12) United States Patent
Hasslacher et al.

(10) Patent No.: US 8,554,444 B2
(45) Date of Patent: Oct. 8, 2013

(54) METHOD FOR OPERATING AN INTERNAL COMBUSTION ENGINE

(75) Inventors: Oliver Hasslacher, Weissach (DE); Rainer Peck, Ludwigsburg (DE); Christian Kriechbaum, Dossenheim (DE); Michael Schenk, Ludwigsburg (DE); Haris Delic, Stuttgart (DE); Stefan Motz, Moeglingen (DE); Steffen Meyer-Salfeld, Leonberg (DE); Micha Muenzenmay, Stuttgart (DE); Bjoern Alexander Schuetz, Besigheim (DE); Horst Mueller, Bietigheim-Bissingen (DE); Harry-Alexander Kempf, Weissach (DE); Ruediger Schaller, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 214 days.

(21) Appl. No.: 13/085,584

(22) Filed: Apr. 13, 2011

(65) Prior Publication Data

US 2011/0257863 A1 Oct. 20, 2011

(30) Foreign Application Priority Data

Apr. 20, 2010 (DE) .......................... 10 2010 027 983

(51) Int. Cl.
*F01N 9/00* (2006.01)
*F01N 11/00* (2006.01)

(52) U.S. Cl.
USPC .................. 701/99; 60/277; 60/271; 60/274; 701/113; 701/115

(58) Field of Classification Search
USPC .............. 60/277, 271, 274; 701/99, 113, 115
See application file for complete search history.

(56) References Cited

U.S. PATENT DOCUMENTS

| | | | | | |
|---|---|---|---|---|---|
| 4,007,589 | A | * | 2/1977 | Neidhard et al. | 60/276 |
| 4,251,989 | A | * | 2/1981 | Norimatsu et al. | 60/276 |
| 4,622,809 | A | * | 11/1986 | Abthoff et al. | 60/274 |
| 5,167,120 | A | * | 12/1992 | Junginger et al. | 60/274 |
| 5,167,934 | A | * | 12/1992 | Wolf et al. | 422/177 |
| 5,203,165 | A | * | 4/1993 | Wild et al. | 60/274 |
| 5,214,915 | A | * | 6/1993 | Schneider et al. | 60/274 |
| 5,267,439 | A | * | 12/1993 | Raff et al. | 60/274 |
| 5,298,865 | A | * | 3/1994 | Denz et al. | 324/509 |
| 5,317,868 | A | * | 6/1994 | Blischke et al. | 60/274 |
| 5,428,956 | A | * | 7/1995 | Maus et al. | 60/277 |
| 5,553,450 | A | * | 9/1996 | Schnaibel et al. | 60/274 |
| 5,610,844 | A | * | 3/1997 | Maus et al. | 700/274 |
| 5,715,678 | A | * | 2/1998 | Aronica et al. | 60/276 |

(Continued)

FOREIGN PATENT DOCUMENTS

| | | | |
|---|---|---|---|
| EP | 1831524 A1 | * | 9/2007 |
| JP | 2011094996 A | * | 5/2011 |
| WO | WO2006067204 | * | 1/2009 |

*Primary Examiner* — James Trammell
*Assistant Examiner* — Jean-Paul Cass
(74) *Attorney, Agent, or Firm* — Michael Best & Friedrich LLP

(57) ABSTRACT

Described is a method for operating an internal combustion engine (1), in which method at least one parameter of the exhaust gas flowing in an exhaust-gas duct (10) is detected by at least one exhaust-gas probe (30; 32), wherein the internal combustion engine (1) is at least temporarily turned over by a starting device (3), during which an injection and combustion of fuel does not take place, and during and/or after which the exhaust-gas probe (30; 32) is adjusted.

18 Claims, 2 Drawing Sheets

(56) References Cited

U.S. PATENT DOCUMENTS

| | | | |
|---|---|---|---|
| 5,751,602 A * | 5/1998 | Maus et al. | 701/103 |
| 5,930,993 A * | 8/1999 | Kammann et al. | 60/274 |
| 6,092,413 A * | 7/2000 | Busch et al. | 73/114.73 |
| 6,151,888 A * | 11/2000 | Schneider et al. | 60/274 |
| 6,227,033 B1 * | 5/2001 | Kainz | 73/23.32 |
| 6,684,628 B2 * | 2/2004 | Gobel et al. | 60/277 |
| 7,356,988 B2 * | 4/2008 | Pott et al. | 60/285 |
| 7,558,667 B2 * | 7/2009 | Kida | 701/114 |
| 7,669,579 B2 * | 3/2010 | Lang et al. | 123/299 |
| 7,673,443 B2 * | 3/2010 | Rodatz et al. | 60/274 |
| 7,904,234 B2 * | 3/2011 | Ruggiano et al. | 701/113 |
| 2006/0059895 A1 * | 3/2006 | Pott | 60/285 |
| 2009/0025689 A1 * | 1/2009 | Ruggiano et al. | 123/491 |

* cited by examiner

METHOD FOR OPERATING AN INTERNAL COMBUSTION ENGINE

BACKGROUND OF THE INVENTION

Internal combustion engines are known on the market which have exhaust systems in which for example lambda probes are used for analyzing the exhaust gas. To ensure the required accuracy of a lambda probe or else of a NOx probe, it is necessary from time to time to carry out an adjustment of the exhaust-gas probes. This is achieved by supplying to the vicinity of the exhaust-gas probe exhaust gas which has an oxygen proportion approximately equal to that found in the ambient air. This may be achieved for example when a vehicle driven by the internal combustion engine is in an overrun mode for a certain minimum period. Such an overrun mode arises for example during downhill driving, during which a sufficient oxygen proportion of the exhaust gas can be expected. When the exhaust system is in such a state, it is now possible to carry out an adjustment of the exhaust-gas probe, for example the lambda probe or the NOx probe. If a vehicle is in contrast operated under other conditions, for example in city traffic, relatively long overrun phases of the internal combustion engine required for said adjustment occur relatively rarely or not at all.

SUMMARY OF THE INVENTION

The invention has the advantage of being able to calibrate an exhaust-gas probe in an exhaust-gas duct of an internal combustion engine relatively often even in situations in which adequately long overrun phases of the internal combustion engine cannot be expected or can be expected only rarely.

The invention is based on the consideration that upon or before the adjustment (which may also be referred to as "calibration") of an exhaust-gas probe, in particular of a lambda probe, fresh air must be flushed through the vicinity of the exhaust-gas probe for an adequately long time. For this purpose, it is necessary that no fuel is injected into the cylinders of the internal combustion engine, and therefore no combustion gas is generated, for a relatively long, predefined time. Only then can a level of flushing quality be ensured which makes it possible for the adjustment of the exhaust-gas probe to be carried out with sufficient accuracy. During the operation of the internal combustion engine, for example in a motor vehicle, so-called overrun phases may occur in which no fuel is injected and which last for a period of time long enough to be able to carry out an adjustment of the exhaust-gas probe. On the other hand, there may be operating situations or usage situations of internal combustion engines in which such overrun phases cannot be expected or in which the overrun phases do not last for an adequate length of time. Furthermore, even in the case of internal combustion engines operated under steady-state conditions, it may be necessary for an exhaust-gas probe which may be provided to be adjusted.

The invention makes use in particular of the fact that internal combustion engines are often operated not without interruptions, but rather have operating intervals during which they are shut down or at least need not impart any power. In this way, operating states may be defined which are suitable for the adjustment of the exhaust-gas probe. According to the invention, a starting device turns over the internal combustion engine, with no fuel being injected, such that no combustion takes place. The fresh air sucked in is therefore "contaminated" neither by injected fuel nor by combustion gases, and therefore passes as pure fresh air into the exhaust-gas duct and consequently permits the flushing of fresh air, whose oxygen proportion is known relatively precisely, through the vicinity of the exhaust-gas probe. Therefore, in turn, a defined initial state is generated for the calibration (or the adjustment) of the exhaust-gas probe.

In addition to this, the invention proposes that an adjustment of the exhaust-gas probe is enabled if an operating variable reaches a value from which it can be inferred that an oxygen proportion of the exhaust gas in a vicinity of the at least one exhaust-gas probe approximately corresponds to an oxygen proportion of ambient air. Here, one or more operating variables of the internal combustion engine or of the exhaust-gas duct may for example be compared with threshold values, upon the exceedance or undershooting of which the calibration of the exhaust-gas probe may be commenced. The advantage of this refinement is primarily that the reliability of the comparison is improved.

It is additionally provided that the operating variable is determined empirically and/or is dependent on the preceding operating state. By means of an empirical determination, it is advantageously possible for experience-based values to be taken into consideration, and by reference to a respectively preceding operating state, the operating variable can be evaluated more accurately. Reliability is thus further improved.

The invention also provides that the operating variable is a time duration since the start of the turning-over operation and/or a gradient of a measurement signal of the exhaust-gas probe. It is therefore possible—for example by means of an empirical determination—to determine a time duration, after the expiry of which an adequate oxygen proportion can be expected in a vicinity of the exhaust-gas probe. A gradient of the measurement signal of the exhaust-gas probe may alternatively or additionally be evaluated. It is for example possible, when the measurement signal of the exhaust-gas probe is no longer changing, that is to say the gradient is approximately zero, to infer that the oxygen proportion in the exhaust gas has a concentration approximately corresponding to the ambient air. Both proposed parameters can be determined relatively easily, which saves on processing resources, and nevertheless deliver reliable results.

One important refinement of the invention provides that the method is carried out if at least one of the following conditions is present:

an operating phase before and/or during a start of the internal combustion engine;

an operating phase during and/or after a stoppage of the internal combustion engine;

a demand for carrying out the method resulting from an automatic or manual intervention.

Three operating situations of the internal combustion engine are therefore defined in which an injection of fuel into the cylinders of the internal combustion engine does not take place, and therefore an adjustment of the exhaust-gas probe is possible. It is possible in particular for the starting process of the internal combustion engine, during which the internal combustion engine is turned over by means of the starting device, for example using an electric starter, without fuel being injected, to be extended over such a length of time as to ensure that the exhaust-gas duct has been adequately flushed and the calibration of the exhaust-gas probe is thus enabled. It is likewise possible for the starter device to be set in operation, such that the internal combustion engine is turned over, with fuel likewise not being injected, for a period of time during and/or after a stoppage of the internal combustion engine. A further suitable operating situation may be effected by means of an automatic or manual intervention during a workshop diagnosis.

According to the invention, it is likewise possible for the method to be implemented without the internal combustion engine being operated directly thereafter. It is sufficient for the internal combustion engine to be turned over in order to flush the exhaust-gas duct, and for the exhaust-gas probe to be calibrated. This possibility is expedient in particular during a workshop diagnosis of the internal combustion engine. It is also conceivable, in the case of a vehicle, for the method to be carried out automatically for example at night while the vehicle is parked.

It is provided according to the invention in particular that the exhaust-gas probe is a lambda probe. Lambda probes are particularly important for correct operation of an internal combustion engine. It is therefore necessary for the lambda probe to be well calibrated. This can be achieved particularly effectively with the precisely known proportion of oxygen in fresh ambient air. The method according to the invention can therefore be advantageously applied to lambda probes.

BRIEF DESCRIPTION OF THE DRAWINGS

Exemplary embodiments of the invention will be explained below with reference to the drawing, in which.

DETAILED DESCRIPTION

Figure 1:
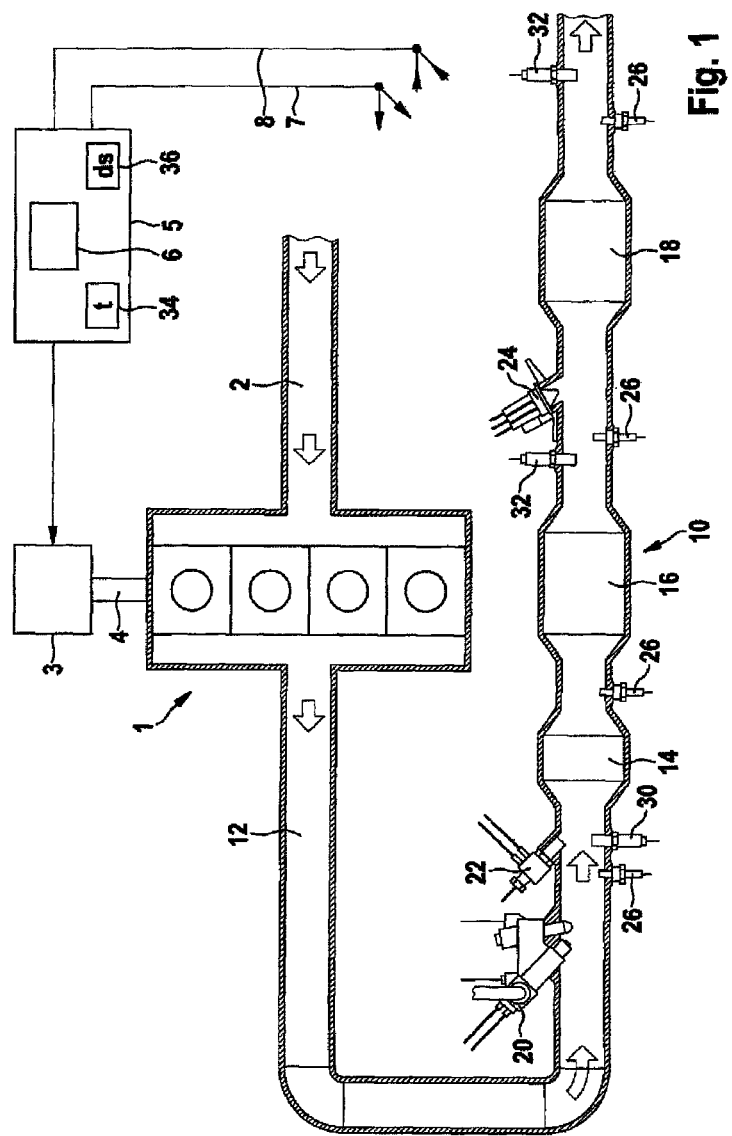
FIG. 1 shows a simplified schematic diagram of an internal combustion engine and an exhaust-gas duct.

In all the figures, the same reference numerals are used for functionally equivalent elements and dimensions, even in different embodiments.

FIG. 1 shows a highly simplified schematic diagram of an internal combustion engine 1 together with an exhaust-gas duct 10 of a motor vehicle. The internal combustion engine 1 is illustrated in the upper region of the drawing and, in the present case, comprises four cylinders (without reference numerals). Indicated to the right thereof is an air system 2 of the internal combustion engine 1. Shown above the internal combustion engine 1 is a starting device 3, for example an electric starter, which can start the internal combustion engine 1 by means of a shaft 4. A control and/or regulating device 5 with a computer program 6 which runs thereon controls inter alia the starting device 3. A bundle of outgoing control lines 7 and a bundle of incoming control lines 8 symbolically represent the connection of the control and/or regulating device 5 to different components of the internal combustion engine 1 and of the exhaust-gas duct 10.

Situated in the lower part of FIG. 1 is the exhaust-gas duct 10 in which the exhaust gas is conducted through and treated substantially from left to right. Said exhaust-gas duct is in the present case the exhaust-gas duct 10 of a diesel motor vehicle and is connected to the internal combustion engine 1 via a pipe connection 12. For this purpose, the exhaust-gas duct 10 has, in the flow direction of the exhaust-gas, a diesel oxidation catalytic converter 14, a diesel particle filter 16 and an SCR catalytic converter 18 (SCR means "selective catalytic reduction"). Arranged upstream of the diesel oxidation catalytic converter 14 is a burner 20 and a valve 22 for injecting fuel. Arranged downstream of the diesel particle filter 16 is a valve 24 by means of which urea-based additives required for the selective catalytic reduction in the SCR catalytic converter 18 can be introduced into the exhaust-gas flow. The exhaust-gas duct 10 also has four temperature sensors 26, a lambda probe 30, and two NOx sensors 32. The elements with the reference numerals 20, 22, 24 and 26 relate only indirectly to the invention and are shown in the drawing merely for better illustration.

The temperature sensors 26, the lambda probe 30 and the NOx sensors 32 are electrically connected to the control and/or regulating device 5. This is merely indicated but not illustrated in detail by the said control lines 7 and 8 in the drawing of FIG. 1. During normal operation of the internal combustion engine, the lambda probe 30 measures the oxygen concentration in the exhaust gas. Over the course of the operating time, said lambda probe 30 becomes detuned, that is to say the signal it outputs no longer reflects the actual oxygen concentration with the desired accuracy. It is therefore necessary for the lambda probe 30 to be adjusted or calibrated from time to time. For this purpose, ideally a gas with a known oxygen concentration is conducted past the lambda probe 30 and then the measured signal is assigned to said oxygen concentration.

An adjustment of the lambda probe 30 is carried out—for example during a start of the internal combustion engine 1—as follows:

The starting device 3 is activated and turns over the internal combustion engine 1 by means of the shaft 4, wherein ambient air is supplied via the air system 2 but at the same time no fuel is injected into the cylinders of the internal combustion engine 1 and therefore also no fuel is burned in the cylinders;

a time duration 34 since the start of the turning-over operation is measured;

a gradient 36 of a measurement signal of the lambda probe 30 is determined, after the expiry of a predefined time duration 34 and/or when the gradient 36 of the measurement signal reaches or exceeds or undershoots a predefined threshold value, the calibration of the lambda probe 30 is enabled and carried out by means of the control and/or regulating device 5; and after the end of the calibration, the injection of fuel into the internal combustion engine 1 is enabled and the internal combustion engine 1 is for example started.

The measurement of the time duration 34 and the determination of the gradient 36 and the evaluation thereof take place in the control and/or regulating device 5. If the method is applied, as described, to a starting process of the internal combustion engine 1, the starting process can be extended by a time period. If, conversely, the method is applied during a stoppage of the internal combustion engine 1, the stoppage may correspondingly be extended by a time period if for example the starting device 3 is actuated after the end of the fuel injection.

It is self-evident that FIG. 1 is merely exemplary and that the method according to the invention is not restricted to diesel engines but rather may likewise be applied to spark-ignition engines and other similar internal combustion engines 1 or the exhaust-gas ducts 10 thereof. It is likewise self-evident that the method may be used not only for a calibration (adjustment) of the lambda probe 30 but also in a similar way for a calibration of the NOx sensors 32 or other probes possibly arranged in the exhaust-gas duct 10.

Figure 2:
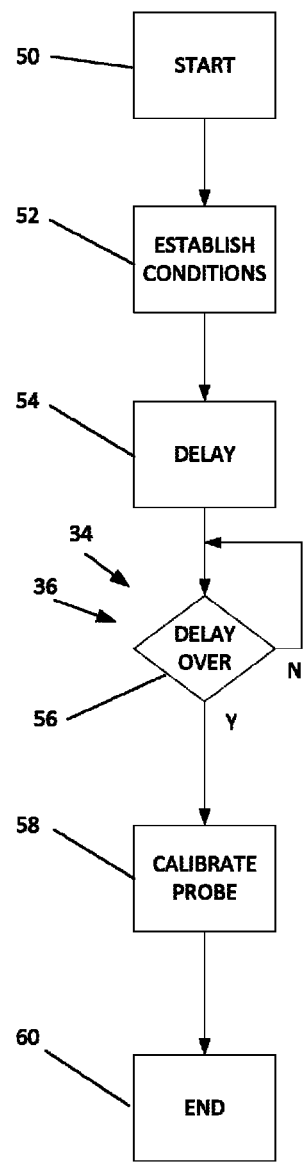
FIG. 2 shows a flow diagram of the sequence of a computer program on a control and/or regulating device of the internal combustion engine.

FIG. 2 shows a flow diagram suitable for executing the method by means of the computer program 6 in the control and/or regulating device 5. The method begins in a start block 50. In a subsequent block 52, conditions are established for turning over the internal combustion engine 1 by means of the starting device 3 without fuel being injected into the cylinders of the internal combustion engine 1. This may take place for example during the start of the internal combustion engine 1 by virtue of the starting process being extended slightly in relation to a normal starting process, with the internal combustion engine 1 being turned over by means of the starting device 3. It is likewise possible during a stoppage of the internal combustion engine 1 to realize a state in which the internal combustion engine 1 is still turning, for example is turned over by the starting device 3, without fuel being injected into the cylinders of the internal combustion engine 1.

In a block 54, a timer for measuring the time duration 34 is started, and at the same time the gradient 36 of the measurement signal of the lambda probe 30 to be calibrated is evaluated. In a subsequent query block 56, it is decided whether the predefined time duration 34 since the start of the turning-over operation has been reached or exceeded, and/or whether the gradient 36 of the measurement signal has reached or exceeded or undershot a value from which it can be inferred that the oxygen proportion of the exhaust gas in the vicinity of the lambda probe 30 approximately corresponds to the oxygen proportion of the ambient air. In general, this will be the case when the gradient falls below a threshold value, and the measurement value is thus substantially constant. If at least one of the two conditions applies, the method proceeds to a subsequent block 58. The procedure at the input of the query block 56 is otherwise repeated until at least one of the conditions is present.

The actual calibration of the lambda probe 30 is carried out in block 58, wherein by means of the preceding method steps, it is ensured that the oxygen proportion of the exhaust gas in the vicinity of the lambda probe 30 approximately corresponds to the oxygen content of the ambient air. After a calibration of the lambda probe 30 has taken place, the method proceeds to an end block 60. The procedure described in FIG. 2 ends there, and the internal combustion engine 1 can either be started by means of an injection of fuel, or the turning-over operation by means of the starting device 3 can be ended and the internal combustion engine shut down.

The invention claimed is:

1. A method for operating an internal combustion engine (1), in which
method at least one parameter of the exhaust gas flowing in an exhaust-gas duct (10) is detected by at least one exhaust-gas probe (30; 32), the method comprising:
temporarily turning over the internal combustion engine (1) by a starting device (3), and injection and combustion of fuel not taking place while the internal combustion engine (1) is being temporarily turned over, and then adjusting the exhaust-gas probe (30; 32).

2. The method according to claim 1, wherein adjustment is enabled if an operating variable reaches a value from which it can be inferred that an oxygen proportion of the exhaust gas in a vicinity of the at least one exhaust-gas probe (30; 32) approximately corresponds to an oxygen proportion of ambient air.

3. The method according to claim 2, wherein the operating variable is determined empirically and is dependent on the preceding operating state.

4. The method according to claim 2, wherein the operating variable is determined empirically.

5. The method according to claim 2, wherein the operating variable is dependent on the preceding operating state.

6. The method according to claim 2, wherein the operating variable is a time duration (34) since the start of the turning-over operation and a gradient (36) of the measurement signal of the exhaust-gas probe (30; 32).

7. The method according to claim 2, wherein the operating variable is a time duration (34) since the start of the turning-over operation.

8. The method according to claim 2, wherein the operating variable is a gradient (36) of the measurement signal of the exhaust-gas probe (30; 32).

9. The method according to claim 1, wherein said method is carried out if at least one of the following conditions is present:
an operating phase before and/or during a start of the internal combustion engine (1); an operating phase during and/or after a stoppage of the internal combustion engine (1);
a demand for carrying out the method resulting from an automatic or manual intervention.

10. The method according to claim 9, wherein said method is carried out without subsequent operation of the internal combustion engine (1).

11. The method according to claim 1, wherein the exhaust-gas probe (30; 32) is a lambda probe (30).

12. The method according to claim 1, wherein the exhaust-gas probe (30, 32) is adjusted while the internal combustion engine is temporarily turned over and the injection and combustion of fuel does not take place.

13. The method according to claim 1, wherein the exhaust-gas probe (30, 32) is adjusted after the internal combustion engine is temporarily turned over and the injection and combustion of fuel does not take place.

14. A non-transitory computer readable storage medium with an executable program stored thereon, wherein the program instructs a microprocessor to perform the following steps, the non-transitory computer readable storage medium for execution on a controller (5) configured to operate an internal combustion engine (1) for a motor vehicle, said internal combustion engine (1) comprising at least one exhaust-gas probe (30; 32) for detecting at least one parameter of the exhaust gas flowing in an exhaust-gas duct (10), the computer program including instructions to
turn over the internal combustion engine (1) by a starting device (3),
injection and combustion of fuel not taking place while the internal combustion engine is being turned over; and
then adjust the exhaust-gas probe (30; 32).

15. The non-transitory computer readable storage medium with an executable program stored thereon according to claim 14, further comprising program instructions to enable the adjustment if an operating variable reaches a value from which it can be inferred that an oxygen proportion of the exhaust gas in a vicinity of the at least one exhaust-gas probe (30; 32) approximately corresponds to an oxygen proportion of ambient air.

16. The non-transitory computer readable storage medium with an executable program stored thereon according to claim 15, wherein the operating variable is a time duration (34) since the start of the turning-over operation and/or a gradient (36) of the measurement signal of the exhaust-gas probe (30; 32).

17. The non-transitory computer readable storage medium with an executable program stored thereon according to claim 15, further comprising program instructions to determine the operating variable empirically and/or based on the preceding operating state.

18. The non-transitory computer readable storage medium with an executable program stored thereon according to claim 14, further comprising program instructions to carry out the program if at least one of the following conditions is present:
an operating phase before and/or during a start of the internal combustion engine (1);
an operating phase during and/or after a stoppage of the internal combustion engine (1);

a demand for carrying out the method resulting from an automatic or manual intervention.

* * * * *